US008352078B2

(12) United States Patent
Kiyota (10) Patent No.: US 8,352,078 B2
(45) Date of Patent: Jan. 8, 2013

(54) ROBOT SYSTEM

(75) Inventor: Yuki Kiyota, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 373 days.

(21) Appl. No.: 12/760,517

(22) Filed: Apr. 14, 2010

(65) Prior Publication Data

US 2010/0268386 A1    Oct. 21, 2010

(30) Foreign Application Priority Data

Apr. 16, 2009 (JP) .................................. 2009-099792

(51) Int. Cl.
*G05B 15/00* (2006.01)
(52) U.S. Cl. ....................................................... 700/264
(58) Field of Classification Search ................... 700/264
See application file for complete search history.

(56) References Cited

FOREIGN PATENT DOCUMENTS

JP    2005-230919    9/2005

*Primary Examiner* — Eric Culbreth
(74) *Attorney, Agent, or Firm* — Ditthavong Mori & Steiner, P.C.

(57) ABSTRACT

A robot system includes at least one robot, robot controllers configured to control the robot, and pendants. The robot controllers include robot group control units each having an operating mode storage unit to store operating mode information to select a robot. The pendants include an enabling device to turn on and off drive power to the robot. The robot group control units are connected via an enable-link-signal line. Each robot group control unit is configured to output an enable link signal by operating the enabling device included in a corresponding pendant to transmit the enable link signal via the enable-link-signal line to all of the robot group control units. Each robot group control unit is configured to output a drive-power-on enable signal to turn on and off drive power to the robot in accordance with the enable link signal and the operating mode information.

18 Claims, 9 Drawing Sheets

ROBOT OPERATING MODE SELECTION

R1 : SLAVE

R2 : MASTER

R3 : INDEPENDENCE

ROBOT SYSTEM

CROSS-REFERENCE TO RELATED APPLICATIONS

The present application claims priority under 35 U.S.C. §119 to Japanese Patent Application No. 2009-099792, filed Apr. 16, 2009. The contents of this application are incorporated herein by reference in their entirety.

BACKGROUND OF THE INVENTION

1. Field of the Invention

The present invention relates to a robot system.

2. Discussion of the Background

A programmer or teaching operator uses a special pendant (also called a teaching device, a teach pendant, or a programming pendant) connected to a robot controller to perform various settings or task teaching at a position near the industrial robot. Japanese Unexamined Patent Application Publication No. 2005-230919, which was filed by the inventors of the present invention, discloses a robot system capable of the above task teaching in which the working of a robot or robots selected using a pendant can be enabled or disabled (on-off control of drive power) in accordance with the manipulation of an enabling device of the pendant.

SUMMARY OF THE INVENTION

According to one aspect of the present invention, a robot system includes at least one robot, a plurality of robot controllers, and pendants. The plurality of robot controllers are connected to each other via a communication line and configured to control the robot. The pendants are connected to the plurality of robot controllers respectively and include an enabling device configured to turn on and off drive power to the robot in a teaching mode. Respective robot controllers include respective robot group control units each having an operating mode storage unit configured to store operating mode information to select a selected robot among the at least one robot. Drive power to the selected robot is turned on and off by operating the enabling device. The robot group control units are sequentially connected to each other via an enable-link-signal line through which drive power is supplied and shut down. Each of the robot group control units is configured to output an enable link signal by operating the enabling device included in a corresponding pendant among the pendants so that the enable link signal is transmitted via the enable-link-signal line to all of the robot group control units connected to each other via the enable-link-signal line. Each of the robot group control units are configured to output a drive-power-on enable signal to turn on and off drive power to the robot in accordance with the enable link signal and the operating mode information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

Figure 1:
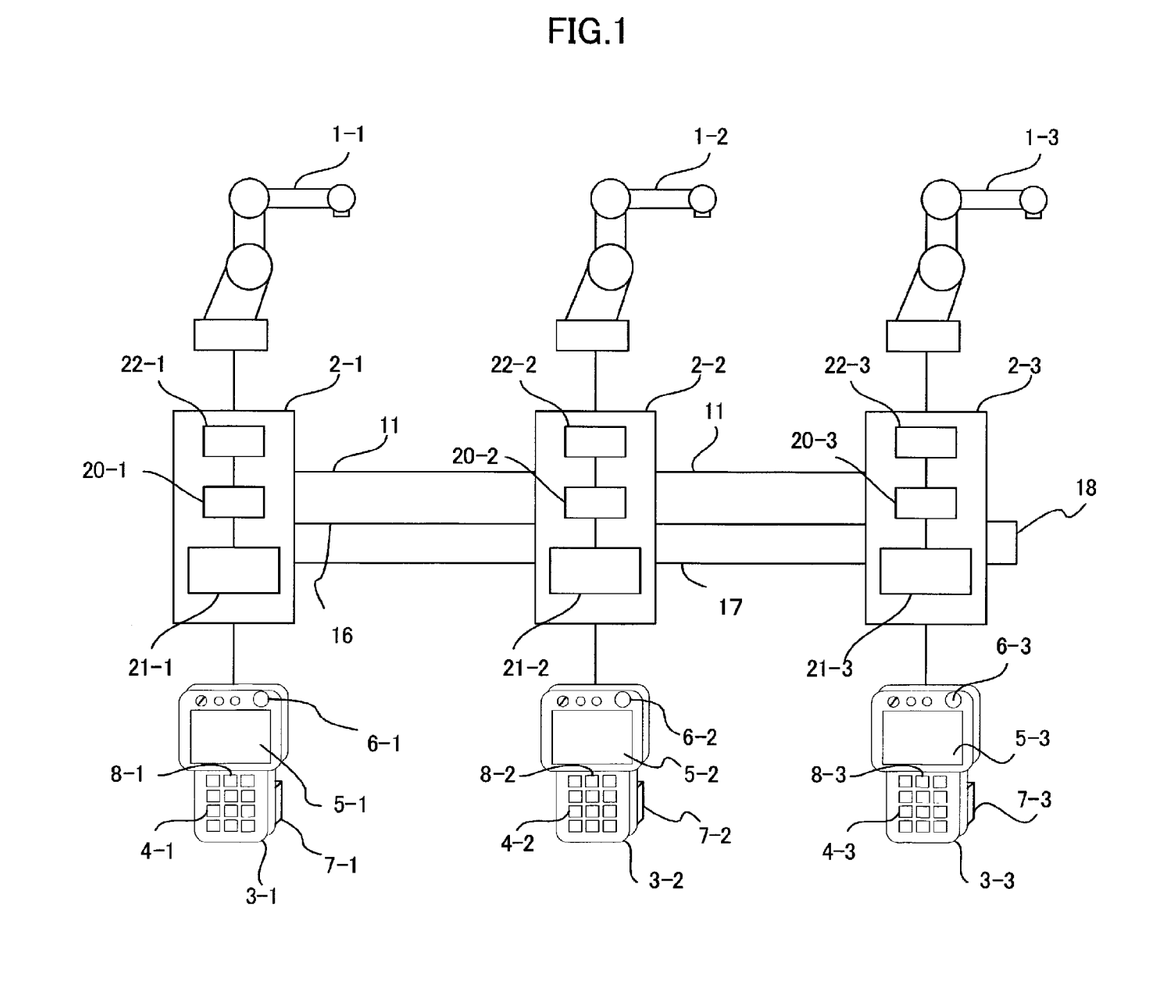
FIG. 1 is a configuration diagram of a robot system according to a first embodiment.

FIG. 1 is a configuration diagram of a robot system according to a first embodiment. In FIG. 1, a first robot 1-1 is connected to a first robot controller 2-1. The first robot 1-1 is further connected to a first pendant 3-1 through the robot controller 2-1. Similarly, a second robot 1-2 is connected to a second robot controller 2-2 and a second pendant 3-2. A third robot 1-3 is connected to a third robot controller 2-3 and a third pendant 3-3. The robot 1-1, 1-2, and 1-3 are hereinafter referred to as a "robot 1" or collectively as the "robots 1" unless distinguished. Similarly, the robot controllers 2-1, 2-2, and 2-3 and the pendants 3-1, 3-2, and 3-3 are hereinafter referred to as a "robot controller 2" or collectively as the "robot controllers 2" and a "pendant 3" or collectively as the "pendants 3", respectively, unless distinguished.

The pendants 3-1, 3-2, and 3-3 are provided with operation units 4-1, 4-2, and 4-3, display units 5-1, 5-2, and 5-3, emergency switches 6-1, 6-2, and 6-3, enabling devices 7-1, 7-2, and 7-3, and drive-power-on ready switches 8-1, 8-2, and 8-3, respectively. The operation units 4-1, 4-2, and 4-3 are operated by programmers or teaching operators (hereinafter referred to as "teaching operators"). The display units 5-1, 5-2, and 5-3 are configured to display task programs of the robots 1-1, 1-2, and 1-3 or the states, settings, or the like of the robot controllers 2-1, 2-2, and 2-3, respectively. The emergency switches 6-1, 6-2, and 6-3 are configured to turn off drive power to the robots 1-1, 1-2, and 1-3 to stop the robots 1-1, 1-2, and 1-3, respectively. The enabling devices 7-1, 7-2, and 7-3 are configured to enable or disable the working of the robots 1-1, 1-2, and 1-3, respectively, during task teaching in a teaching mode. The drive-power-on ready switches 8-1, 8-2, and 8-3 are operated by the teaching operators when drive power to the robots 1-1, 1-2, and 1-3 is ready to be turned on, respectively, after a robot peripheral device such as a jig is ready to use. The enabling devices 7-1, 7-2, and 7-3 may be configured using two-position switches or three-position switches, or may be designed for one-handed operation which are provided on one side of the pendants 3-1, 3-2, and 3-3 or designed for two-handed operation which are provided on both sides of the pendants 3-1, 3-2, and 3-3, respectively. In the embodiment, either configuration may be used. The enabling devices 7-1, 7-2, and 7-3 are hereinafter referred to as an "enabling device 7" or collectively as the "enabling devices 7" unless distinguished. Similarly, the emergency switches 6-1, 6-2, and 6-3 and the drive-power-on ready switches 8-1, 8-2, and 8-3 are hereinafter referred to as an "emergency switch 6" or collectively as the "emergency switches 6" and a "drive-power-on ready switch 8" or "drive-power-on ready switches 8", respectively, unless distinguished.

The robot controllers 2-1, 2-2, and 2-3 are provided with robot group control units 21-1, 21-2, and 21-3, respectively. The robot group control units 21-1, 21-2, and 21-3 communicate with one another via a communication line 11.

The robot group control units 21-1, 21-2, and 21-3 transmit enable link signals for turning on or off drive power on the basis of operating mode information and signals from the enabling devices 7-1, 7-2, and 7-3 of the pendants 3-1, 3-2, and 3-3, respectively. The enable link signals are transmitted to the robot group control units 21-1, 21-2, and 21-3 of the robot controllers 2-1, 2-2, and 2-3 via an enable-link-signal line 15 (including an enable-link-signal sending line 16, an enable-link-signal return line 17, and a turn line 18).

There are three operating modes used for task teaching of the robots 1-1, 1-2, and 1-3: a master mode (cooperative master) and a slave mode (cooperative slave) for cooperative working, and an independence mode for independent working. The term "cooperative working" means working that involves the movement of robots in which a robot that is controlled to drive by a robot controller set in the cooperative slave follows a robot that is controlled to drive by a robot controller set in the cooperative master. The operating modes of the robots 1-1, 1-2, and 1-3 can be set or changed using the pendants 3-1, 3-2, and 3-3. Information about the operating modes of the robots 1-1, 1-2, and 1-3, which are desired by the teaching operators, is stored in an operating mode storage unit 13 (see FIG. 3). Depending on the setting of the operating mode, drive power to the robots 1-1, 1-2, and 1-3 is turned on or off as follows.

When the enabling device 7 of the pendant 3 connected to the robot controller 2 that is set to the master mode is pressed, drive power to a robot that is set to operate in the master mode and a robot that is set to operate in the slave mode is turned on. There is no effect on the on-off control of drive power to a robot that is set to operate in the independence mode. In addition, even when the enabling device 7 of the pendant 3 connected to the robot controller 2 that is set to the slave mode is operated, drive power to any robot is not turned on.

When the enabling device 7 of the pendant 3 connected to the robot controller 2 that is set to the independence mode is pressed, drive power to a robot that is set to operate in the independence mode is turned on, which has no effect on the on-off control of drive power to a robot that is set to operate in the master mode or the slave mode or any other robot that is set to operate in the independence mode.

The robot group control units 21-1, 21-2, and 21-3 output a drive-power-on enable signal 41 to drive power control units 20-1, 20-2, and 20-3, respectively, on the basis of the operating modes set in the robot controllers 2-1, 2-2, and 2-3 and an enable link signal 14 transmitted via the enable-link-signal line, and also output the enable link signal 14 to other robot controllers 2 connected via the enable-link-signal line. Upon receipt of the drive-power-on enable signal 41, the drive power control units 20-1, 20-2, and 20-3 perform on-off control of drive power to drive units 22-1, 22-2, and 22-3, respectively, in accordance with whether to enable or disable the supply of drive power, and supply or shut down drive power to the robots 1-1, 1-2, and 1-3, respectively. The robot group control units 21-1, 21-2, and 21-3 monitor an emergency-stop or abnormality signal (not illustrated) provided in the robot controllers 2-1, 2-2, and 2-3, respectively. In an emergency-stop state or an abnormality state, the drive-power-on enable signals to be output to the drive power control units 20-1, 20-2, and 20-3 are disabled to perform control to shut down drive power to the drive units 22-1, 22-2, and 22-3, and drive power to the robots 1-1, 1-2, and 1-3 is shut down. The robot group control units 21-1, 21-2, and 21-3 are hereinafter referred to as a "robot group control unit 21" or collectively as the "robot group control units 21" unless distinguished. Similarly, the drive power control units 20-1, 20-2, and 20-3 and the drive units 22-1, 22-2, and 22-3 are hereinafter referred to as a "drive power control unit 20" or collectively as the "drive power control units 20" and a "drive unit 22" or "drive units 22", respectively, unless distinguished.

A more detailed description will now be given with reference to FIGS. 2 to 9.

Figure 2:
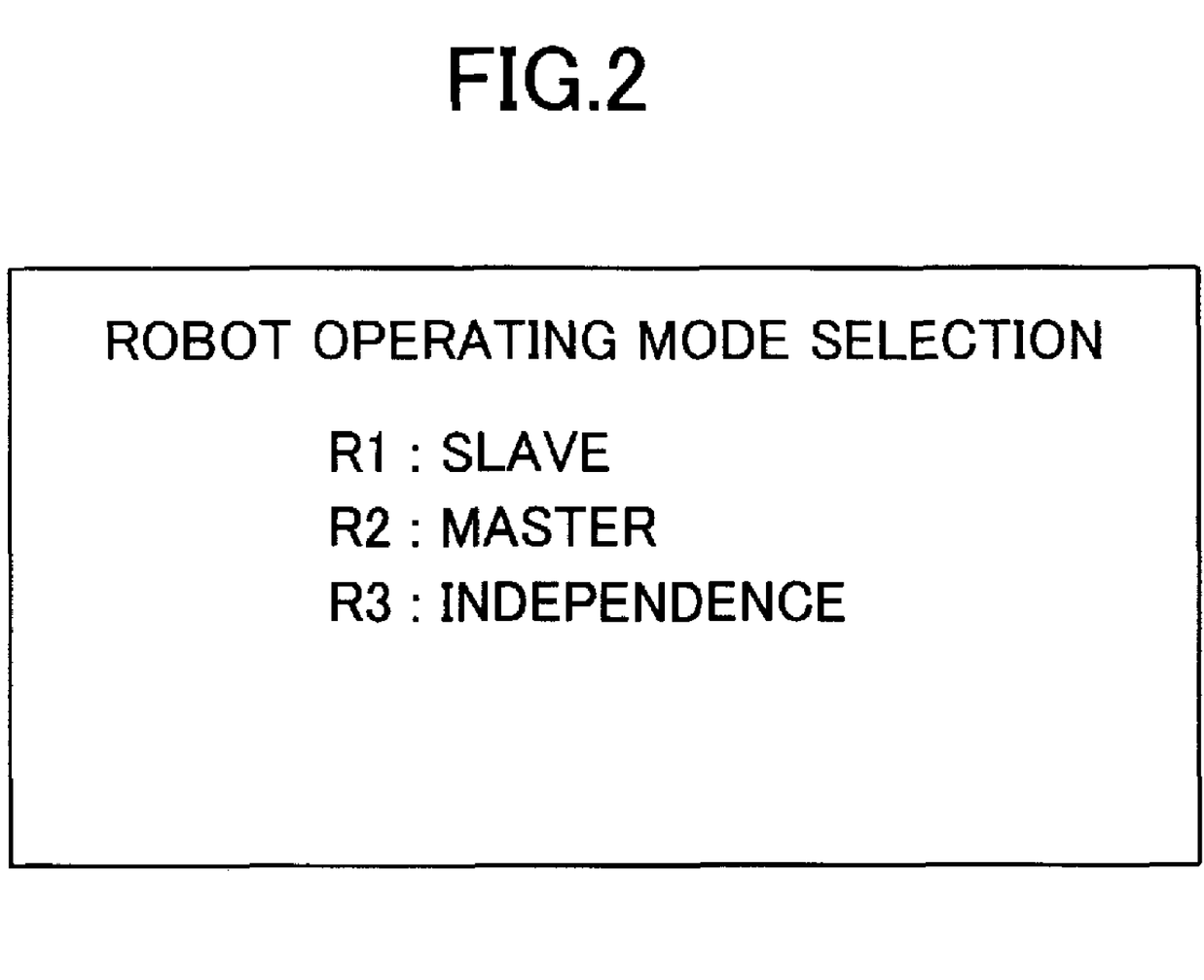
FIG. 2 is a diagram illustrating a robot operating mode selection screen according to the first embodiment.

FIG. 2 illustrates a screen for selecting the operating modes of the robots 1-1, 1-2, and 1-3, which is provided on each of the pendants 3-1, 3-2, and 3-3. In FIG. 2, R1 represents the first robot 1-1, R2 represents the second robot 1-2, and R3 represents the third robot 1-3. Only one robot can be set to operate in the master mode. A plurality of robots can be set to operate in each of the slave mode and the independence mode. Before teaching of a task program, one of the pendants 3-1, 3-2, and 3-3 is used to set the operating modes of the robots 1-1, 1-2, and 1-3 to the master mode in which a robot serves as the master of cooperative working, the slave mode in which a robot serves as a slave of cooperative working, or the independence mode in which a robot works independently. The set operating modes of the robots 1-1, 1-2, and 1-3 are transmitted to each of the robot group control units 21-1, 21-2, and 21-3 of the robot controllers 2-1, 2-2, and 2-3 via the communication line 11 so that the same content is stored. In the example illustrated in FIG. 2, the robot R1 (first robot 1-1) is set to operate in the slave mode of cooperative working, the robot R2 (second robot 1-2) is set to operate in the master mode of cooperative working, and the robot R3 (third robot 1-3) is set to operate in the independence mode of independent working.

Figure 3:
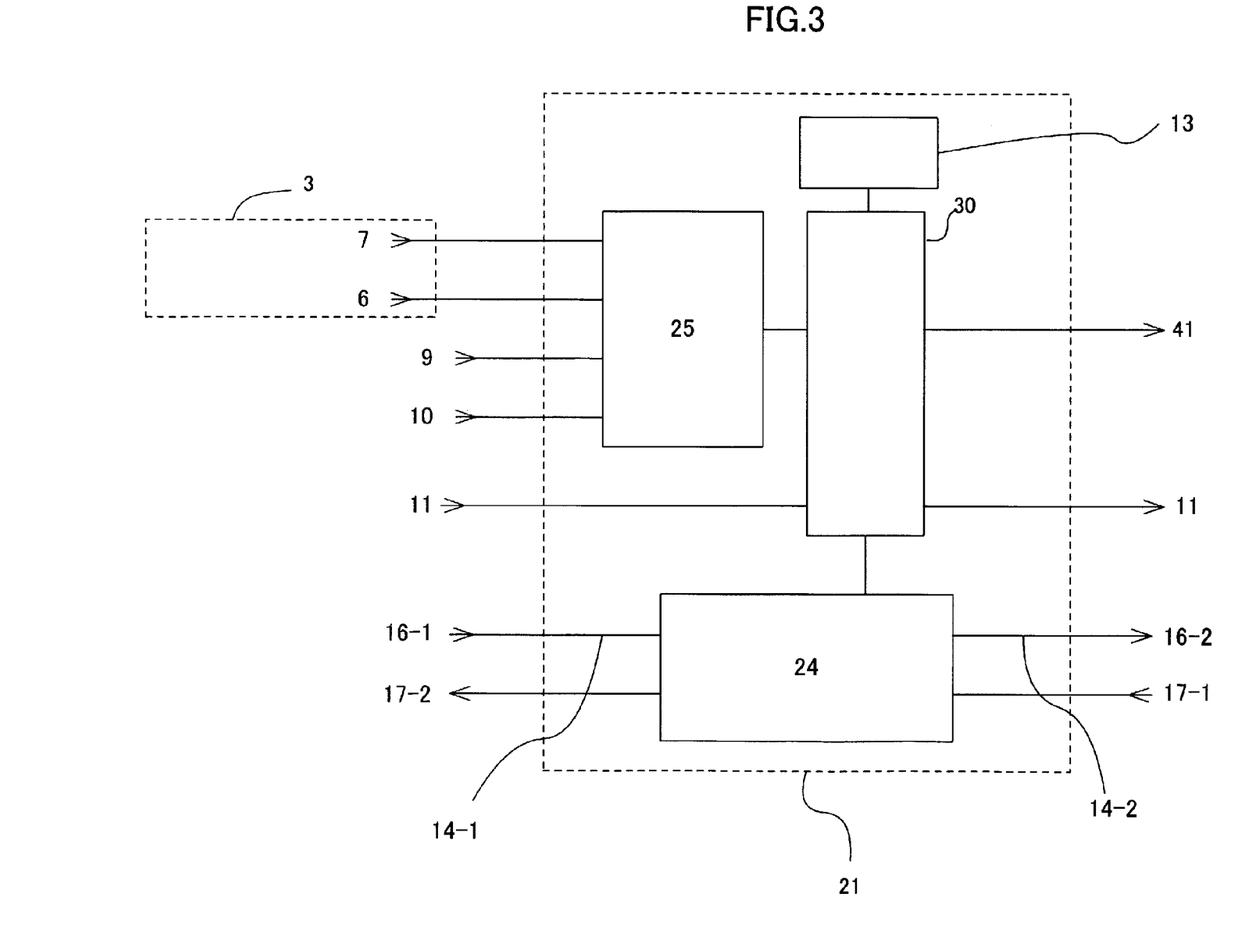
FIG. 3 is an internal configuration diagram of a robot group control unit according to the first embodiment.

FIG. 3 illustrates the internal configuration of a robot group control unit 21. In FIG. 3, signals input to and output from the robot group control unit 21 are assigned arrows to indicate the transmission directions of the signals. The robot group control unit 21 includes an enable-link-signal input/output circuit (hereinafter referred to as an "enable-link-signal I/O") 24 to and from which an enable link signal (a signal transmitted via the enable-link-signal line) is input and output via the enable-link-signal line. An enable link signal 14-1 output from the preceding robot group control unit is input to a central processing unit (CPU) 30 through the enable-link-signal I/O 24. The CPU 30 performs signal processing on the enable link signal 14-1 together with operating mode information stored in the operating mode storage unit 13, and outputs a result to the subsequent robot group control unit via the enable-link-signal I/O 24 as an enable link signal 14-2. The CPU 30 further receives, through an input circuit 25, signals such as signals from the enabling device 7 and the emergency switch 6 of the pendant 3 connected thereto, a signal from an emergency switch 9 provided on the robot controller 2, a signal from an emergency switch 10 on a high-order controller configured to integrally control a plurality of robots, such as a programmable logic controller (PLC), where the emergency switch 9 and the emergency switch 10 are not illustrated in the figures, and a signal for opening and closing a safeguard door. The CPU 30 controls the drive-power-on enable signal 41 to be output to the drive power control unit 20 on the basis of the signals from the above-described switches and the enable link signal 14.

Figure 4:
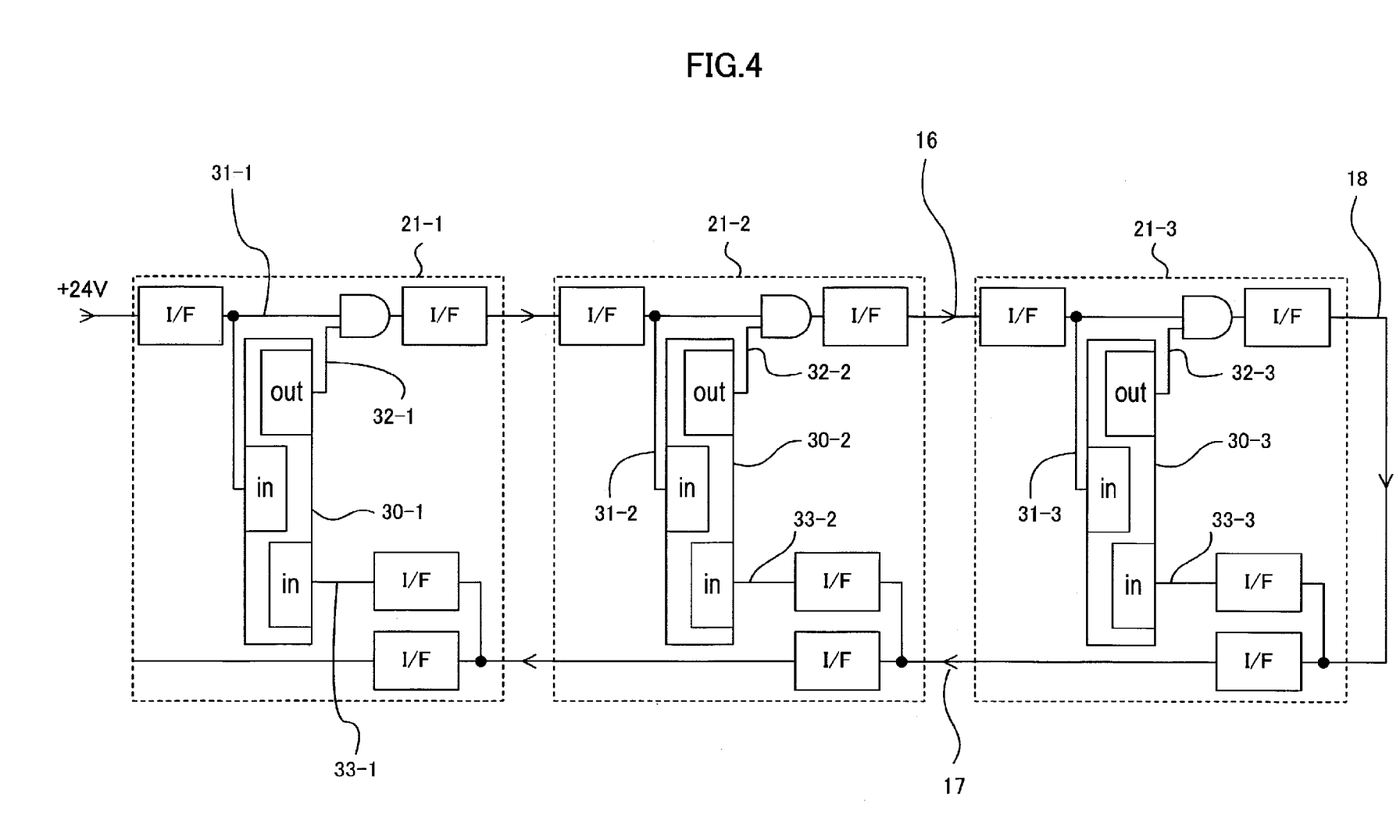
FIG. 4 is a diagram of an enable-link-signal input/output circuit of the robot group control unit according to the first embodiment.

The robot group control units 21 will now be described in further detail. FIG. 4 is a detailed diagram of the enable-link-signal I/O 24 and CPU 30 illustrated in FIG. 3. In FIG. 4, signal interfaces (in FIG. 4, abbreviated as "I/Fs") serve as interfaces through which the enable link signal 14 propagates between the robot group control units 21, and may be configured using a photocoupler, a relay, or any other desired signal transmission means. The robot group control units 21-1, 21-2, and 21-3 include CPUs 30-1, 30-2, and 30-3, respectively, and the CPUs 30-1, 30-2, and 30-3 are configured to process signals input to and output from the robot group control units 21-1, 21-2, and 21-3, respectively.

The robot group control units 21 are connected to one another via the enable-link-signal line 15. Each of the robot group control units 21 is provided with a sending-line input terminal, a sending-line output terminal, a return-line input terminal, and a return-line output terminal. The sending-line input terminal of the robot group control unit 21-1 located at an end (most upstream) of the enable-link-signal line is connected to a direct current source of 24 V (in the embodiment, an enable link signal of a direct current voltage of 24 V is input). The sending-line output terminal of the robot group control unit 21-1 located at the end is connected to the sending-line input terminal of the subsequent robot group control unit, i.e., the robot group control unit 21-2, via the enable-link-signal sending line 16, which is in turn connected to the sending-line input terminal of the robot group control unit 21-3 located at the other end (most downstream). The turn line 18 extends from the sending-line output terminal of the robot group control unit 21-3 located most downstream to the return-line input terminal of the robot group control unit 21-3. The enable-link-signal return line 17 extends from the return-line output terminal of the robot group control unit 21-3 located most downstream to the return-line input terminal of the preceding robot group control unit, i.e., the robot group control unit 21-2, which is further connected to the further preceding robot group control unit, i.e., the robot group control unit 21-1. In this manner, a pair of enable link signals for a sending line and a return line are transmitted.

In the robot group control unit 21-1, an enable-link-sending-line input signal 31-1 input from the sending-line input terminal and passing through the signal interface and an enable-link-return-line input signal 33-1 input from the return-line input terminal and passing through the signal interface are input to the CPU 30-1. The CPU 30-1 outputs an enable-link output enable signal 32-1 on the basis of the operating-mode information stored in the operating mode storage unit 13 and a signal from the enabling device 7-1 of the pendant 3-1. Then, the AND signal of the enable-link output enable signal 32-1 and the enable-link-sending-line input signal 31-1 is output from the sending-line output terminal through the signal interface.

The robot group control units 21-2 and 21-3 have similar configurations.

Figure 5:
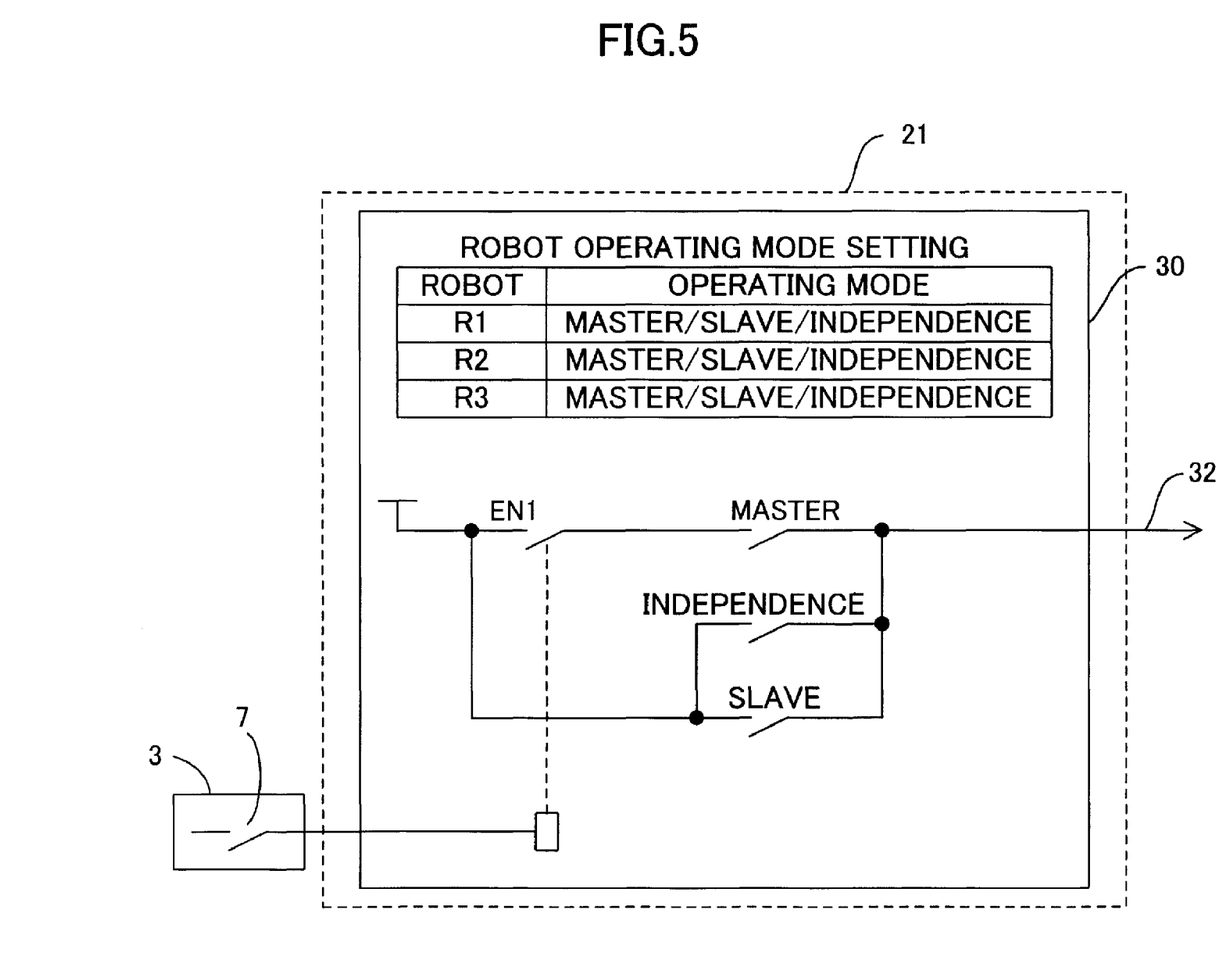
FIG. 5 is a sequence diagram illustrating conditions under which a robot group control unit outputs an enable-link output enable signal according to the first embodiment.

Conditions under which an enable-link output enable signal 32 is output from the CPU 30 will now be described with reference to a sequence diagram (equivalent circuit) illustrated in FIG. 5. The conditions under which the enable-link output enable signal 32 is output differ depending on the setting of the operating modes of the robots 1-1, 1-2, and 1-3. When the master mode is set, the enabling device 7 of the corresponding one of the pendants 3 is operated. When the enabling device 7 is turned on, the enable-link output enable signal 32 is turned on. When the enabling device 7 is turned off, the enable-link output enable signal 32 is turned off. When the slave mode or the independence mode is set, the enable-link output enable signal 32 is always turned on.

With the above connections and the signals input to and output from the CPU 30 of the robot group control unit 21, when the two input signals, i.e., an enable-link-sending-line input signal 31 and an enable-link-return-line input signal 33, are turned on, the CPU 30 determines that drive power supply is enabled in accordance with the enable link signal 14.

Figure 6:
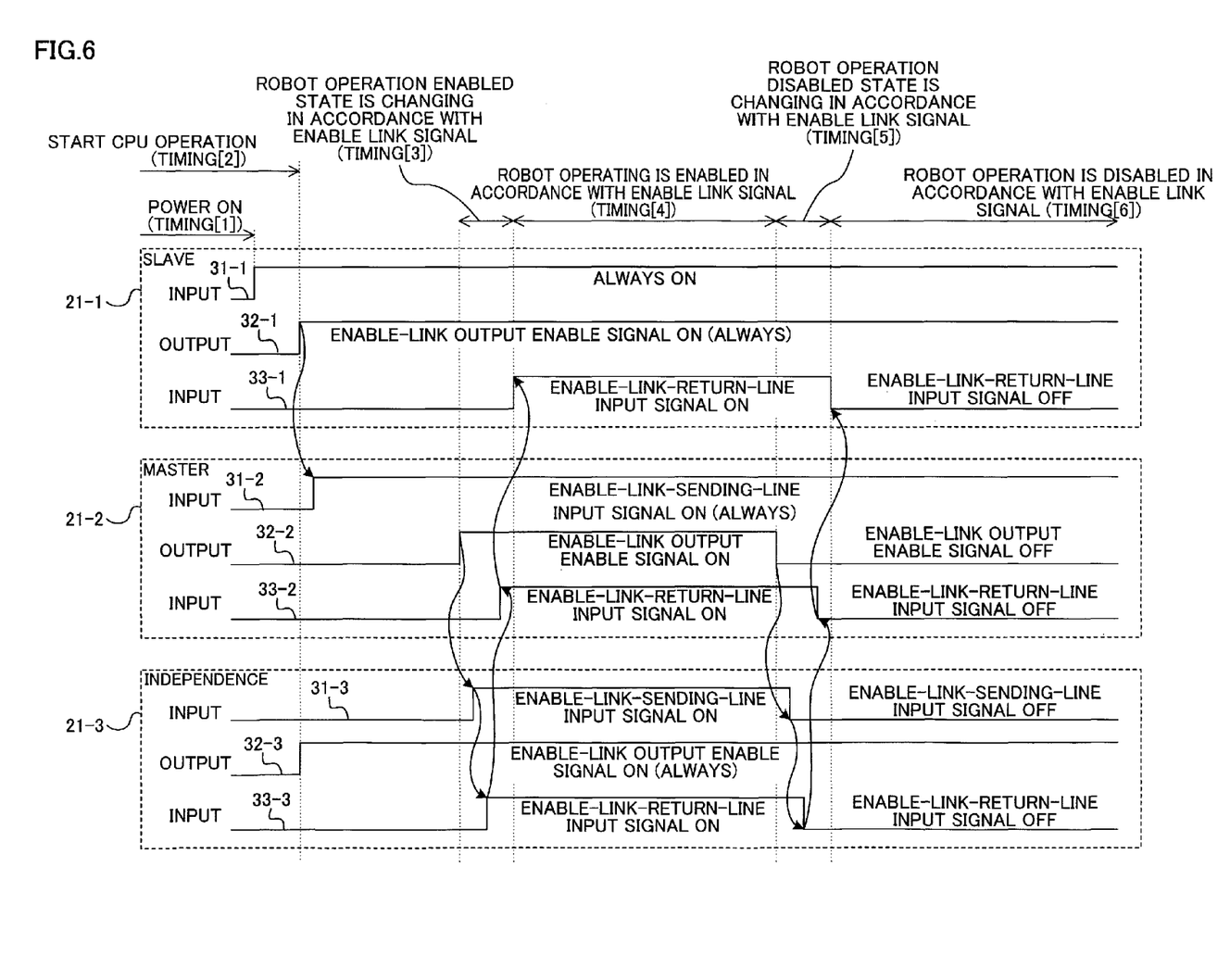
FIG. 6 is a timing chart of enable-link-signal input/output circuits of robot group control units according to the first embodiment.

FIG. 6 is a timing chart of the enable-link-signal I/Os described with reference to FIG. 4 (each of which corresponds to the enable-link-signal I/O 24 illustrated in FIG. 3). In FIG. 6, by way of example, the operating modes of the robots 1-1, 1-2, and 1-3 are the slave mode, the master mode, and the independence mode, respectively.

At timing [1], the robot controllers 2-1, 2-2, and 2-3 are powered on. Then, a voltage of 24 V is supplied to the robot group control unit 21-1. Thus, the enable-link-sending-line input signal 31-1 is always turned on.

At timing [2], the CPUs 30-1, 30-2, and 30-3 are booted. Then, as described with reference to FIG. 5, the robot group control units 21-1 and 21-3 of the robot controllers 2-1 and 2-3 that are set to the slave mode and the independence mode, respectively, turn on the enable-link output enable signals 32-1 and 32-3, respectively. At this time, the robot group control unit 21-1 also turns on the enable-link-sending-line input signal 31-2 of the robot group control unit 21-2 located subsequent thereto because the enable-link-sending-line input signal 31-1 and the enable-link output enable signal 32-1 are turned on.

At timing [3], the enabling device 7-2 of the pendant 3-2 connected to the robot group control unit 21-2 of the robot controller 2-2 that is set to the master mode is turned on. Then, the enable-link output enable signal 32-2 is turned on. Since the enable-link-sending-line input signal 31-2 has already been turned on, the enable-link-sending-line input signal 31-3 of the robot group control unit 21-3 is turned on. Since the enable-link output enable signal 32-3 has already been turned on, the enable link signal 14 at the sending-line output terminal is turned on. Since the robot group control unit 21-3 is the last one, the enable-link-return-line input signal 33-3 is turned on in accordance with the enable link signal 14 via the turn line 18. Subsequently, the enable-link-return-line input signals 33-2 and 33-1 of the robot group control units 21-2 and 21-1 are sequentially turned on. The above-described signal transmission allows the robot group control units 21-1, 21-2, and 21-3 to turn on all the enable-link-sending-line input signals 31-1, 31-2, and 31-3 and the enable-link-return-line input signals 33-1, 33-2, and 33-3, respectively. It is therefore determined that the working of the robots 1-1, 1-2, and 1-3 is enabled, that is, drive power supply to the robots 1-1, 1-2, and 1-3 is enabled, in accordance with the enable link signal 14.

At timing [4], the working of the robots 1-1, 1-2, and 1-3 is still enabled in accordance with the enable link signal 14.

At timing [5], the enabling device 7-2 of the pendant 3-2 connected to the robot group control unit 21-2 of the robot controller 2-2 that is set to the master mode is turned off. Then, the enable-link output enable signal 32-2 is turned off. Then, the enable-link-sending-line input signal 31-3 of the subsequent robot group control unit, i.e., the robot group control unit 21-3, is also turned off, and the enable-link-return-line input signals 33-3, 33-2, and 33-1 are also sequentially turned off. The above-described signal transmission allows the robot group control units 21-1, 21-2, and 21-3 to determine that the working of the robots 1-1, 1-2, and 1-3 is disabled, that is, drive power supply is disabled, in accordance with the enable link signal 14.

At timing [6], the working of the robots 1-1, 1-2, and 1-3 is still disabled in accordance with the enable link signal 14.

In this manner, the on or off state of the enabling device 7-2 of the pendant 3-2 connected to the robot controller 2-2 that is set to the master mode is transmitted to the robot group control units 2-1, 2-2, and 2-3.

Figure 7:
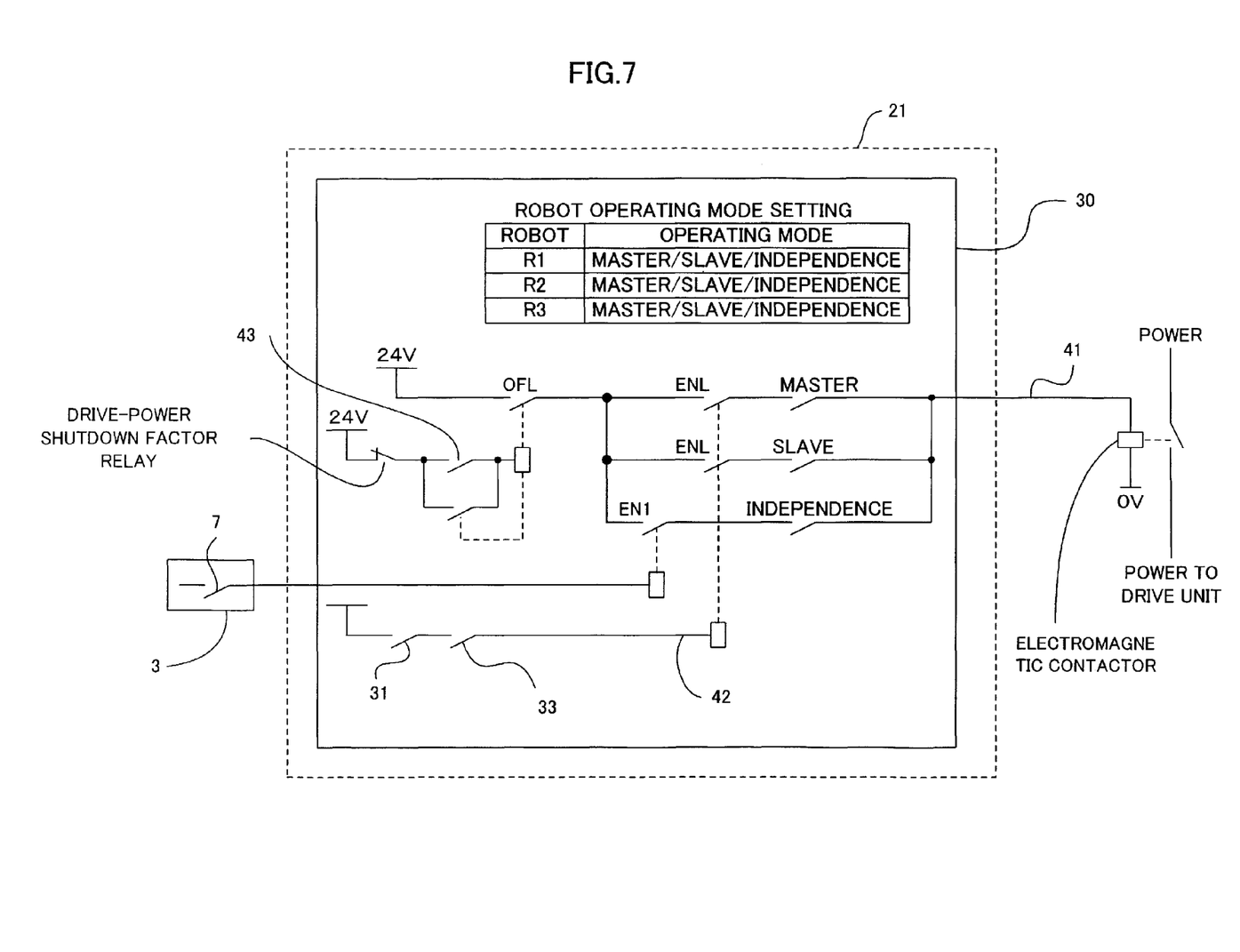
FIG. 7 is a sequence diagram illustrating conditions under which a robot group control unit outputs a drive-power-on enable signal according to the first embodiment.

FIG. 7 is a sequence diagram illustrating conditions under which the drive-power-on enable signal 41 is output from the robot group control unit 21 to the drive power control unit 20. Relays are driven in accordance with the drive-power control signal 42 that is based on the enable link signal 14 (the enable-link-sending-line input signal 31 and the enable-link-return-line input signal 33). The relays have normally-open contacts ENL. The normally-open contacts ENL are turned on (closed) when both the enable-link-sending-line input signal 31 and the enable-link-return-line input signal 33 are turned on. A relay activated by the enabling device 7 of the pendant 3 has a normally-open contact EN1.

A relay OFL is driven by a circuit line in which a drive-power shutdown factor relay and a normally-open contact of a drive-power-on ready relay 43 are connected in series from a direct current source of 24 V. The drive-power shutdown factor relay is closed due to shutdown of drive power such as emergency stop or detection of the occurrence of abnormality, and the drive-power-on ready relay 43 is closed when the drive-power-on ready switch 8 of the pendant 3 is turned on. A normally-open contact of the relay OFL is connected in parallel to the drive-power-on ready relay 43 in the circuit line. In the above circuit configuration, the relay OFL is a normally open contact of a relay that self-holds the on (closed) state when the drive-power-on ready switch 8 is turned on and that cancels the self-holding due to a drive power shutdown factor such as emergency stop or detection of the occurrence of abnormality.

Contacts of the master, independence, and slave are signal contacts that are closed in accordance with the operating mode information stored in the respective robot group control units 21.

Specifically, the drive-power-on enable signal 41 is output, under no drive power shutdown factor such as emergency stop, when the enable link signal 14 is turned on while drive-power-on ready switch 8 is turned on (the relay OFL is turned on) and the master or slave mode is set as the operating mode. An electromagnetic contactor of the drive power control unit 20 is driven in accordance with the signal 41, and power is supplied to the drive unit 22 via a contact of the electromagnetic contactor to turn on drive power to the corresponding one of the robots 1. In a case where the independence mode is set as the operating mode, the normally-open contact EN1 is turned on (closed) or off (opened) by the manipulation of the enabling device 7 of the pendant 3, and the drive-power-on enable signal 41 is output.

The circuit illustrated in FIG. 7 is an equivalent circuit, and may be configured using the CPU 30 and logic operation elements.

Since each of the robot group control units 21 performs the above operations, the output conditions of the drive-power-on enable signal 41 differ depending on the setting of the operating mode.

First, when a robot controller 2 is set in the master mode, the drive-power-on ready switch 8 of the pendant 3 connected thereto is turned on to turn on the relay OFL. Then, the enabling device 7 is turned on to turn on the enable-link output enable signal 32, as described with reference to FIG. 5. Since the enable-link-sending-line input signal 31 and the enable-link-return-line input signal 33 are turned on, the normally-open contact ENL is turned on (closed) in accordance with the enable link signal 14, and the drive-power-on enable signal 41 is output. Thus, the drive power control unit 20 supplies drive power to the corresponding one of the robots 1.

Next, when the slave mode is set as the operating mode, the drive-power-on ready switch 8 of the pendant 3 connected thereto is turned on in advance to turn on (close) the relay OFL.

For improved efficiency of the drive-power-on ready operation, the drive-power-on ready switch 8 of the pendant 3 connected to the robot controller 2 that is set to the master mode may be turned on to turn on (close) the relay OFL, and the switch-on information may be transmitted to the robot controller 2 that is set to the slave mode via a communication line so that the relay OFL in the robot controller 21 can be turned on (closed).

When the enabling device 7 of the pendant 3 connected to the robot controller 2 that is set to the master mode is turned on to turn on (close) the normally-open contact ENL in accordance with the enable link signal 14, the drive-power-on enable signal 41 is output. Thus, the drive power control unit 20 supplies drive power to the corresponding one of the robots 1.

When a robot controller 2 is set in the independence mode, the drive-power-on ready switch 8 of the pendant 3 connected thereto is turned on in advance to turn on (close) the relay OFL. The enabling device 7 of the pendant 3 is turned on, thereby closing the normally-open contact EN1 and outputting the drive-power-on enable signal 41. Thus, the drive power control unit 20 supplies drive power to the corresponding one of the robots 1.

A specific example will now be described in the context of the operating modes set in the example illustrated in FIG. 2. Since the robot 1-2 is in the master mode, the enabling device 7-2 of the pendant 3-2 is turned on, thereby outputting the drive-power-on enable signal 41-2 from the robot group control unit 21-2. Thus, the drive power control unit 20-2 supplies drive power to the robot 1-2. Since the robot 1-1 is in the slave mode, the enabling device 7-1 of the pendant 3-1 is rendered inactive, and the enabling device 7-2 of the pendant 3-2 connected to the robot controller 2-2 that is set to the master mode is turned on, thereby outputting the drive-power-on enable signal 41-1 in accordance with the enable link signal 14 transmitted from the robot group control unit 21-2. Thus, the drive power control unit 20-1 supplies drive power to the robot 1-1.

In contrast, the robot 1-3 is in the independence mode. Thus, independent of the normally-open contact ENL based on the enable link signal 14, the enabling device 7-3 of the pendant 3-3 is turned on, thereby outputting the drive-power-on enable signal 41-3. Thus, the drive power control unit 20-3 supplies drive power to the robot 1-3.

That is, the enabling device 7-2 of the pendant 3-2 can be used to perform control to turn on and off drive power to the robots 1-1 and 1-2, and the enabling device 7-3 of the pendant 3-3 can be used to perform control to turn on and off drive power to the robot 1-3. This allows a plurality of human operators to perform task teaching in parallel.

With the procedure described above, the drive-power-on enable signals 41-1, 41-2, and 41-3 are output from the robot group control units 21-1, 21-2, and 21-3 to the drive power control units 20-1, 20-2, and 20-3, respectively, and the drive power control units 20-1, 20-2, and 20-3 perform on-off control of drive power to the drive units 22-1, 22-2, and 22-3 to supply and shut down drive power to the robots 1-1, 1-2, and 1-3, respectively.

Figure 8A:
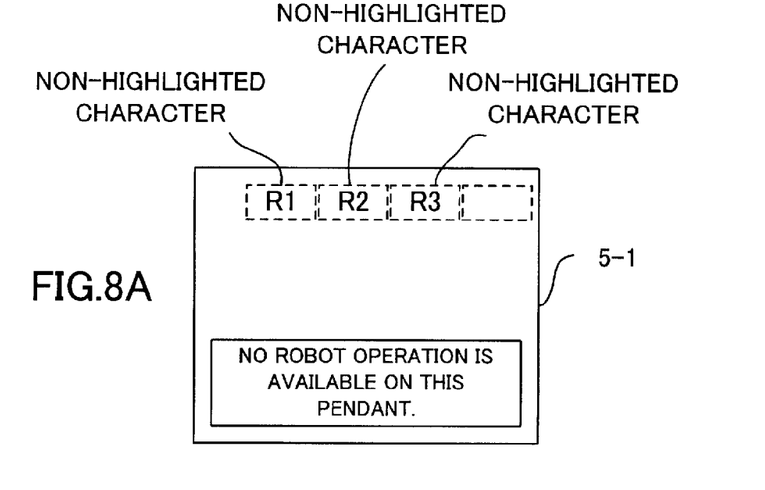
FIGS. 8A to 8C are diagrams illustrating examples of display on pendants according to the first embodiment.
Figure 8B:
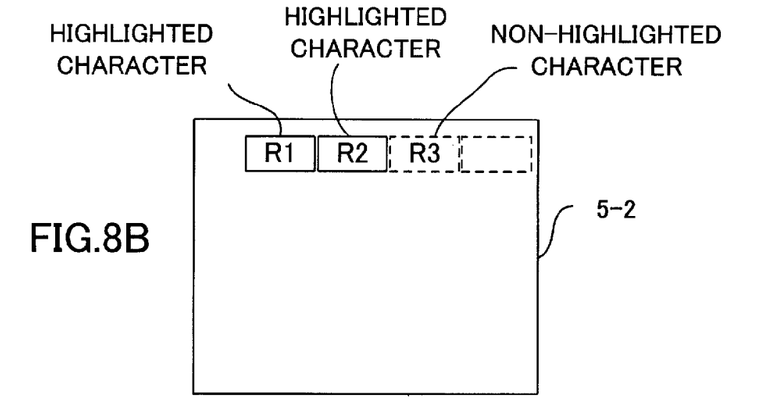
Figure 8C:
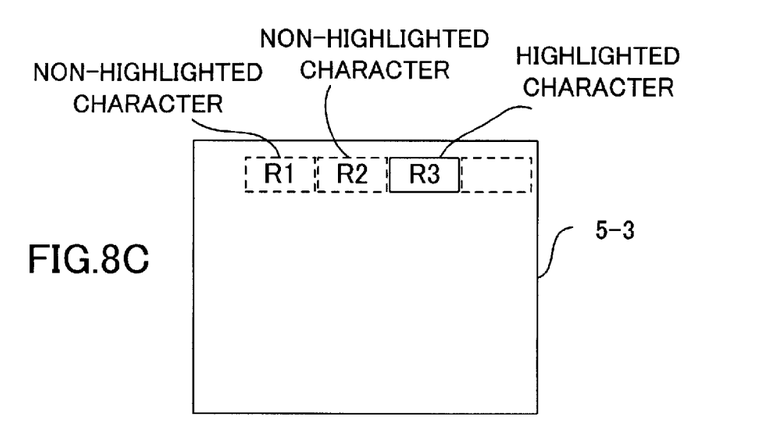

FIGS. 8A to 8C illustrate examples of the display units 5-1, 5-2, and 5-3 of the pendants 3-1, 3-2, and 3-3, respectively.

In the display examples, the robots 1-1, 1-2, and 1-3 that can be controlled using the pendants 3-1, 3-2, and 3-3 are displayed on the display units 5-1, 5-2, and 5-3 on the basis of the operating modes of the robots 1-1, 1-2, and 1-3 stored in the robot group control units 21-1, 21-2, and 21-3. This allows operators to confirm the operability of the robots 1-1, 1-2, and 1-3 using the pendants 3-1, 3-2, and 3-3. FIGS. 8A, 8B, and 8C illustrate examples of display on the pendants 3-1, 3-2, and 3-3 when the operating modes illustrated in FIG. 2 are set, respectively, by way of example.

Since the pendant 3-2 allows drive power control of the robots 1-1 and 1-2, the character "R1" representing the robot 1-1 and the character "R2" representing the robot 1-2 are displayed as highlighted characters. Since drive power control of the robot 1-3 is not performed, the character "R3" representing the robot 1-3 is displayed as a non-highlighted character.

Since the pendant 3-3 allows drive power control of the robot 1-3, the character "R3" representing the robot 1-3 is displayed as a highlighted character. Since no robot can be controlled to operate using the pendant 3-1 connected to the robot controller 2-1 that is set to the slave mode, the characters "R1", "R2", and "R3" are displayed as non-highlighted characters, and a message indicating that no robot operation is available on the pendant 3-1 connected to the robot controller 2-1 set to the slave mode is displayed on the screen.

While in the embodiment described above, robots are to be driven, objects driven by a one-axis or more-axis motor, for example, a jig such as a travel cart or a positioner, may be used. While three robots are used in the illustrated embodiment, any number of robots more than one may be connected.

Figure 9:
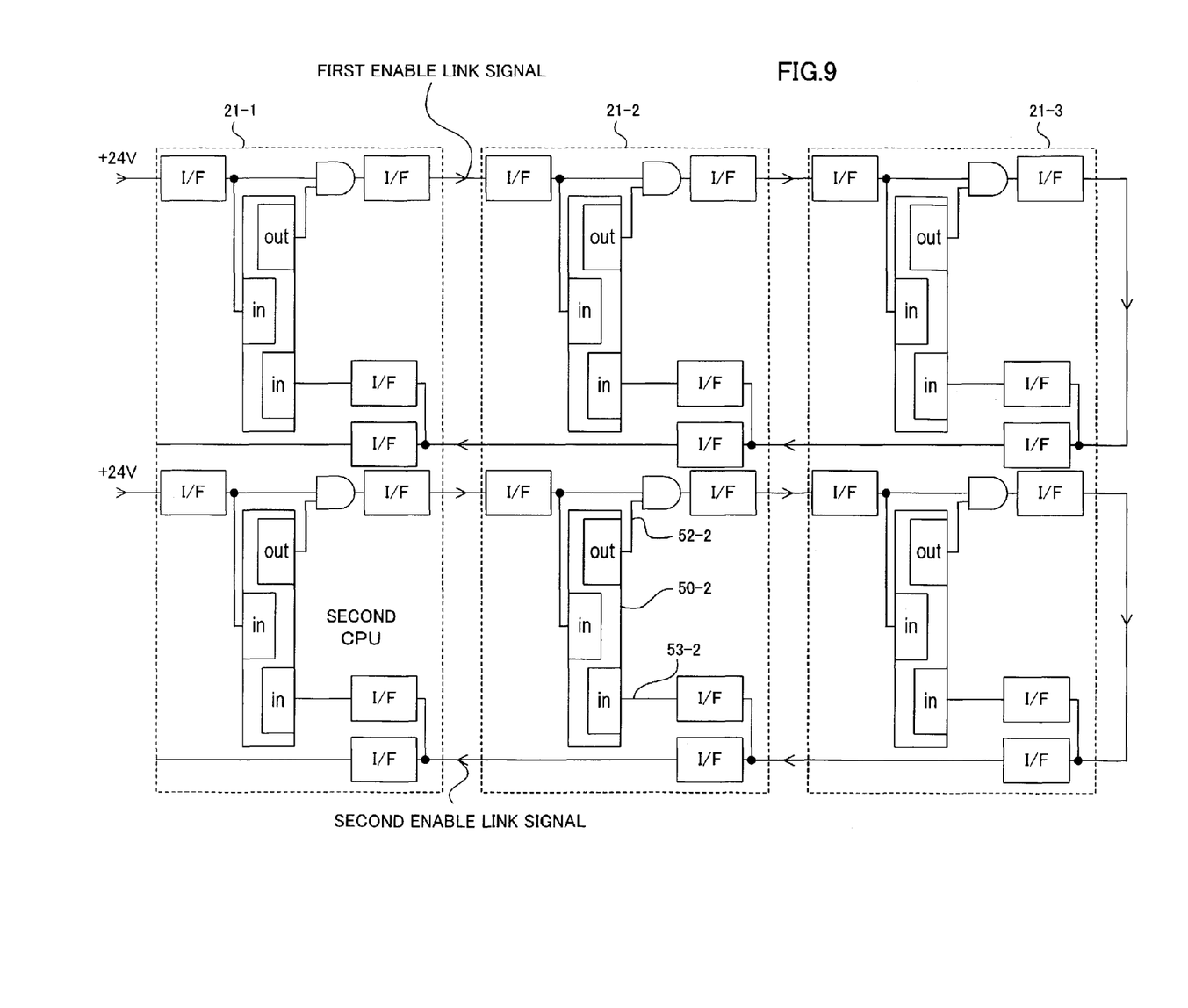
FIG. 9 is a circuit diagram illustrating an example dual configuration of an enable-link-signal input/output circuit.

In the illustrated embodiment, a single enable link signal is used. However, as illustrated in FIG. 9, two enable link signals may be used and may be processed using different CPUs to provide dual independent circuitry. Therefore, even when a single fault of a component or an element occurs, drive power can be shut down using the remaining CPU to ensure a high-reliability circuit capable of more reliable shutdown of drive power.

Therefore, an enable link signal is transmitted between robot controllers. Thus, an enabling device of a pendant can be operated to perform drive power control of a single master robot and a plurality of slave robots and drive power control of a single independent robot in parallel. In addition, since a robot group operation enabling device as disclosed in Japanese Unexamined Patent Application Publication No. 2005-230919 is not required, the size of the entire system can be reduced and complex wiring is not required.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A robot system comprising:
   a plurality of robots;
   a plurality of robot controllers configured to respectively control the robots;
   a plurality of pendants respectively connected to the plurality of robot controllers and respectively comprising enabling devices configured to output enable switch signals to switch turning on and off the robots in a teaching mode including a plurality of operating modes;
   the robot controllers respectively comprising robot group controllers each having an operating mode storage device configured to store operating mode information to determine which operating mode is selected from the operating modes in the teaching mode;
   an enable-link-signal line sequentially connecting the robot group controllers to transmit a first enable link input signal between the robot group controllers;
   each of the robot group controllers being configured to generate a first enable link output signal based on the operating mode information stored in the operating mode storage device, the enable switch signal from the enabling device, and the first enable link input signal input from a preceding robot group controller of the robot group controllers via the enable-link-signal line, and being configured to output the first enable link output signal as the first enable link input signal via the enable-link-signal line; and
   each of the robot group controllers being configured to output a drive-power-on enable signal to turn on and off the robot in accordance with the enable link signal, the operating mode information stored in the operating mode storage device, and the first enable link input signal input from a preceding robot group controller of the robot group controllers via the enable-link-signal line.

2. The robot system according to claim 1,
   wherein the enable-link-signal line comprises an enable-link-signal sending line, an enable-link-signal return line, and a turn line.

3. The robot system according to claim 1,
   wherein each of the robot group controllers comprises a sending-line input terminal, a sending-line output terminal, a return-line input terminal, and a return-line output terminal,
   wherein the first enable link input signal input to the sending-line input terminal of a first end robot group controller among the robot group controllers is kept in an ON state,
   wherein the sending-line output terminal of the first end robot group controller is connected to the sending-line input terminal of a subsequent robot group controller among the robot group controllers via an enable-link-signal sending line to repeat a connection between subsequent robot group controllers among the robot group controllers via the enable-link-signal sending line,
   wherein the sending-line output terminal of a second end robot group controller among the robot group controllers is connected to the return-line input terminal of the second end robot group controller via a turn line, and
   wherein the return-line output terminal of the second end robot group controller is connected to the return-line input terminal of a preceding robot group controller among the robot group controllers via an enable-link-signal return line to repeat a connection between preceding robot group controllers among the robot group controllers via the enable-link-signal return line.

4. The robot system according to claim 2,
   wherein each of the robot group controllers comprises a sending-line input terminal, a sending-line output terminal, a return-line input terminal, and a return-line output terminal,
   wherein the first enable link input signal input to the sending-line input terminal of a first end robot group controller among the robot group controllers is kept in an ON state,
   wherein the sending-line output terminal of the first end robot group controller is connected to the sending-line input terminal of a subsequent robot group controller among the robot group controllers via the enable-link-signal sending line to repeat a connection between subsequent robot group controllers among the robot group controllers via the enable-link-signal sending line, wherein the sending-line output terminal of a second end robot group controller among the robot group controllers is connected to the return-line input terminal of the second end robot group controller via the turn line, and wherein the return-line output terminal of the second end robot group controller is connected to the return-line input terminal of a preceding robot group controller among the robot group controllers via the enable-link-signal return line to repeat a connection between preceding robot group controllers among the robot group controllers via the enable-link-signal return line.

5. The robot system according to claim 1, wherein each of the robot group controllers comprises a central processing device and is configured to output the drive-power-on enable signal in accordance with the first enable link input signal, the operating mode information stored in the operating mode storage device, the enable switch signal output from a corresponding enabling device among the enabling devices, a drive-power-on ready signal, and a drive power shutdown factor.

6. The robot system according to claim 1, wherein each of the robot group controllers comprises two central processing devices, wherein the robot group controllers are sequentially connected via two independent enable-link-signal lines, and wherein the two central processing devices are configured to output independent drive-power-on enable signals in accordance with the first enable link input signals transmitted via the two enable-link-signal lines, the operating mode information stored in the operating mode storage device, a signal output from a corresponding enabling device among the enabling devices, a drive-power-on ready signal, and a drive power shutdown factor.

7. The robot system according to claim 1, wherein the enable-link-signal line comprises an enable-link-signal sending line and an enable-link-signal return line, wherein the enable-link-signal sending line sequentially connects the robot group controllers to forward transmit the first enable link input signal between the robot group controllers, wherein the enable-link-signal return line sequentially connects the robot group controllers to backward transmit a second enable link input signal between the robot group controllers, and wherein each of the robot group controllers is configured to output, to a subsequent robot group controller of the robot group controllers via the enable-link-signal return line, the second enable link input signal input from a subsequent robot group controller of the robot group controllers via the enable-link-signal return line.

8. The robot system according to claim 7, wherein the robot group controllers include a first end robot group controller configured to generate the first enable link output signal based on the operating mode information stored in the operating mode storage device, the enable switch signal from the enabling device, and the first enable link input signal set to a predetermined signal.

9. The robot system according to claim 8, wherein the robot group controllers include a second end robot group controller having a sending-line output terminal and a return-line input terminal, wherein the second end robot group controller is configured to output the first enable link input signal through the sending-line output terminal and is arranged on an opposite side of the first end robot group controller in the robot group controllers, wherein the enable-link-signal line further comprises a turn line connecting the sending-line output terminal to the return-line input terminal, and wherein the second end robot group controller is configured to output, via the enable-link-signal return line as the second enable link input signal, the first enable link input signal transmitted via the turn line.

10. The robot system according to claim 7, wherein each of the robot group controllers is configured to output the drive-power-on enable signal to turn on and off the robot in accordance with the enable link signal, the operating mode information stored in the operating mode storage device, the first enable link input signal input from a preceding robot group controller of the robot group controllers via the enable-link-signal sending line, and the second enable link input signal input from a subsequent robot group controller of the robot group controllers via the enable-link-signal return line.

11. The robot system according to claim 10, wherein the operating modes includes a master mode and a slave mode, wherein, if the operating mode information stored in the operating mode storage device includes the master mode, the robot group controller generates the first enable link output signal based on the operating mode information stored in the operating mode storage device, the enable switch signal from the enabling device, and the first enable link input signal input from a preceding robot group controller of the robot group controllers via the enable-link-signal sending line, and wherein, if the operating mode information stored in the operating mode storage device includes the slave mode, the robot group controller generates the first enable link output signal based on the operating mode information stored in the operating mode storage device, and the first enable link input signal input from a preceding robot group controller of the robot group controllers via the enable-link-signal sending line without using the enable switch signal from the enabling device.

12. The robot system according to claim 11, wherein, if the operating mode information stored in the operating mode storage device includes the master mode, the robot group controller outputs the drive-power-on enable signal to turn on and off a corresponding robot of the robots in accordance with the operating mode information stored in the operating mode storage device, the first enable link input signal input from a preceding robot group controller of the robot group controllers via the enable-link-signal sending line, and the second enable link input signal input from a subsequent robot group controller of the robot group controllers via the enable-link-signal return line without using the enable link signal, and wherein, if the operating mode information stored in the operating mode storage device includes the slave mode, the robot group controller outputs the drive-power-on enable signal to turn on and off a corresponding robot of the robots in accordance with the operating mode information stored in the operating mode storage device, the first enable link input signal input from a preceding robot group controller of the robot group controllers via the enable-link-signal sending line, and the second enable link input signal input from a subsequent robot group controller of the robot group controllers via the enable-link-signal return line without using the enable link signal.

13. The robot system according to claim 11,
wherein the operating modes further includes an independence mode, and
wherein, if the operating mode information stored in the operating mode storage device includes the independence mode, the robot group controller generates the first enable link output signal based on the operating mode information stored in the operating mode storage device, and the first enable link input signal input from a preceding robot group controller of the robot group controllers via the enable-link-signal sending line without using the enable switch signal from the enabling device.

14. The robot system according to claim 13,
wherein, if the operating mode information stored in the operating mode storage device includes the independence mode, the robot group controller outputs the drive-power-on enable signal to turn on and off a corresponding robot of the robots in accordance with the operating mode information stored in the operating mode storage device and the enable link signal without using the first enable link input signal input from a preceding robot group controller of the robot group controllers via the enable-link-signal sending line and the second enable link input signal input from a subsequent robot group controller of the robot group controllers via the enable-link-signal return line.

15. The robot system according to claim 1,
wherein the operating modes includes a master mode and a slave mode,
wherein, if the operating mode information stored in the operating mode storage device includes the master mode, the robot group controller generates the first enable link output signal based on the operating mode information stored in the operating mode storage device, the enable switch signal from the enabling device, and the first enable link input signal input from a preceding robot group controller of the robot group controllers via the enable-link-signal line, and
wherein, if the operating mode information stored in the operating mode storage device includes the slave mode, the robot group controller generates the first enable link output signal based on the operating mode information stored in the operating mode storage device, and the first enable link input signal input from a preceding robot group controller of the robot group controllers via the enable-link-signal line without using the enable switch signal from the enabling device.

16. The robot system according to claim 15,
wherein, if the operating mode information stored in the operating mode storage device includes the master mode, the robot group controller outputs the drive-power-on enable signal to turn on and off a corresponding robot of the robots in accordance with the operating mode information stored in the operating mode storage device and the first enable link input signal input from a preceding robot group controller of the robot group controllers via the enable-link-signal line without using the enable link signal, and
wherein, if the operating mode information stored in the operating mode storage device includes the slave mode, the robot group controller outputs the drive-power-on enable signal to turn on and off a corresponding robot of the robots in accordance with the operating mode information stored in the operating mode storage device and the first enable link input signal input from a preceding robot group controller of the robot group controllers via the enable-link-signal line without using the enable link signal.

17. The robot system according to claim 15,
wherein the operating modes further includes an independence mode, and
wherein, if the operating mode information stored in the operating mode storage device includes the independence mode, the robot group controller generates the first enable link output signal based on the operating mode information stored in the operating mode storage device and the first enable link input signal input from a preceding robot group controller of the robot group controllers via the enable-link-signal line without using the enable switch signal from the enabling device.

18. The robot system according to claim 17,
wherein, if the operating mode information stored in the operating mode storage device includes the independence mode, the robot group controller outputs the drive-power-on enable signal to turn on and off a corresponding robot of the robots in accordance with the operating mode information stored in the operating mode storage device and the enable link signal without using the first enable link input signal input from a preceding robot group controller of the robot group controllers via the enable-link-signal line.

* * * * *